United States Patent Office 3,108,999
Patented Oct. 29, 1963

1

3,108,999
GUANIDINE OR MELAMINE PROCESS
Kenneth J. Shaver, Kirkwood, Mo., assignor to Monsanto Chemical Company, St. Louis, Mo., a corporation of Delaware
No Drawing. Filed May 8, 1961, Ser. No. 108,299
10 Claims. (Cl. 260—249.7)

The present invention relates to novel processes for preparing guanidine and/or melamine. The present invention further relates to novel processes in which guanidine and/or melamine may be prepared from urea and a particular class of catalysts. The present invention more particularly relates to a novel process wherein guanidine may be intermediately prepared in a step of a process for the manufacture of melamine and in which guanidine may be either recovered or separated as a guanidine salt or converted to melamine. The present invention also relates to a novel process for preparing melamine whereby one mol of melamine may be prepared from three mols of urea.

It has been proposed to produce guanidine by a variety of procedures using cyanamide, dicyandiamide, guanylurea and the like as starting materials. Attempts to use the less expensive compound urea, in general, were not particularly successful. Thus, in one process it was attempted to prepare guanidine by heating urea and gaseous ammonia at highly elevated temperatures and pressures of ammonia. A side reaction between the reaction product and the water, formed during the reaction, resulted in long reaction periods, and even then low guanidine yields were obtained.

It has also been proposed heretofore, in U.S. Patent 2,469,338, issued May 3, 1949, to Johnstone S. McKay, to form di-guanidine phosphate by fusing a mixture of urea and phosphorous pentoxide. However, at a temperature of between 190° C. and 300° C. such process resulted in yields of only 47% of theory and consumed significantly large quantities of high-cost phosphorous pentoxide. The guanidine salt so obtained had the disadvantage of being a relatively expensive product.

In accordance with the processes of the present invention it has been found possible to obtain guanidine from urea in high yields and without the disadvantages of the prior art processes.

It has been proposed heretofore in U.S. Patent 2,776,-285, patented January 1, 1957, issued to Colver P. Dyer, to produce melamine by continuously injecting molten urea into a substantial excess of molten melamine in a non-precious metal, pressure-resistant vessel at a superatmospheric pressure sufficient to prevent appreciable vaporization and deamination of the molten melamine, to form a suspension of molten urea in molten melamine in which suspension the molten urea and intermediate products derived therefrom are out of contact with the walls of such vessel until the urea and intermediate products are converted to molten melamine and gaseous byproducts in such vessel, while maintaining the temperature of such suspension above the melting point of melamine.

It has further been proposed heretofore in U.S. Patent 2,727,037, patented December 13, 1955, issued to Carol A. Hochwalt and assigned to Monsanto Chemical Co., to prepare melamine by heating urea at a temperature of from 300° C. to 600° C. and at pressures of above

2

700 p.s.i. in a pressure resistant vessel made of a non-precious metal alloy lined with a continuous coating of a phosphorous compound.

It has also been proposed heretofore, in U.S. Patent 2,550,659, issued April 24, 1951, to Raymond A. Vignee, to prepare melamine from urea wherein the reaction is catalyzed by addition of minor proportions, e.g. less than 10 mol percent of at least one strong stable mineral acid or salt or anhydride thereof which contains an element of atomic number 15 to 17. The materials thus added consist of acids such as phosphoric, sulfuric or hydrochloric or a salt or anhydride thereof or a mixture thereof. According to this process urea is charged to a chrome nickel steel converter and about 0.01 to 5 mol percent of phosphoric acid or diammonium hydrogen phosphate, soluble in the charge, is added to the charge which is heated, in the absence of substantial amounts of water at about 350° C.–360° C. under a pressure of the gaseous decomposition products of urea of about 1000–3000 p.s.i. for a time sufficient to develop a pressure of at least 1000 p.s.i. by decomposition of the urea reactant to convert a proportion of the urea to melamine.

While the aforementioned processes are suitable for the preparation of melamine, such processes are difficult to carry out in that they require equipment which is pressure resistant to extremely high pressures, e.g. up to 10,000 p.s.i. Such equipment has a high initial cost and is also both difficult and expensive to maintain in operating condition. Moreover, the conversion of urea to melamine under the above mentioned combination of superatmospheric pressures and elevated temperatures results in the decomposition of urea with the formation of such products as cyanuric acid, ammeline, ammelide, biuret, cyamelide, ammonium cyanurate and various other non-volatile products together with such volatile products as cyanic acid and ammonium cyanate and perhaps other materials of unknown composition.

Thus, under such pressures and temperatures the conversion of urea to melamine takes place via a series of complex and obscure reactions with the formation of a large number of intermediate materials which must either be converted to melamine or removed from the melamine after it is produced if the melamine is to be obtained in pure form. Although the conversion of such intermediates to melamine is substantially accomplished by the above-referred to processes, the conversion requires relatively extended periods of reaction time which is costly and otherwise disadvantageous.

Additionally the aforementioned processes tend to corrode the metal of the pressure resistant metal reactor resulting in metal contamination of the melamine giving the melamine an off color.

Although, as noted above, the operation of these previously described processes involve a series of complex reaction the overall theoretical conversion of urea to melamine in such processes is usually suitably represented by the following equation:

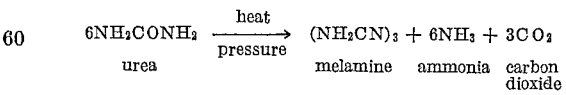

in which theoretically six mols of urea are consumed in the formation of one mol of melamine if 100% yield of melamine, based on 6 mols of urea, is achieved. In practice 100% yields of melamine, based on the above equation, are not achieved.

In accordance with the present invention the conversion of urea to melamine may be more economically accomplished, without the use of high pressures and without the need for expensive reaction vessels, by a process in which it is possible to convert substantially three mols of urea to one mol of melamine on a theoretical basis.

Accordingly, it is an object of the present invention to provide a novel process for converting urea to melamine which overcomes many of the limitations and problems of the prior art processes for producing melamine.

It is another object of the present invention to provide a novel catalytic process for the conversion of urea to guanidine and/or a reaction mixture containing free guanidine or combined guanidine values wherein quanidine or salts thereof may be obtained in high yields based on a theoretical reaction conversion of one mol of urea to one mol of guanidine.

It is still another object of the present invention to provide a process wherein theoretically one mol of melamine may be prepared from three mols of urea.

Still further objects and advantages of the invention will become apparent from the following description and the appended claims.

It has presently been found possible in accordance with the processes of this invention to obtain guanidine by heating urea in the presence of a reaction product of ammonia and a pentavalent phosphorous oxide at a temperature in the range of from about 132° C. to 350° C. preferably from about 210° C. to 320° C. and at a pressure below 200 p.s.i.g. preferably below 100 p.s.i.g. Guanidine may be prepared by heating urea, either in the presence of, or admixed with, the aforementioned reaction product, e.g., with or without admixing the two. However, it has generally been found desirable to mix from about 5% to 60%, preferably 10% to 40% of urea as a dry solid, with from about 95% to 40%, preferably 90% to 60% of the reaction product of ammonia and a pentavalent phosphorous oxide at room temperature and to heat the resulting mixture within the above-mentioned temperature range, preferably at a pressure of 0–100 p.s.i.g. By so proceeding a reaction mass is formed from which guanidine may be separated either in the form of free guanidine or as a guanidine salt or, alternatively, the reaction mass may be heated, as described in greater detail hereinafter, with ammonia to form melamine. The melamine thus formed can then be separated from the ammonia.

The term "pentavalent phosphorous oxide" as used herein is intended to include oxides of phosphorous wherein the phosphorous is present in the oxide in the pentavalent state or, differently stated, such oxides consist essentially of pentavalent phosphorous and oxygen.

Although the conversion of urea to guanidine may be accomplished in accordance with the processes of this invention at pressures substantially higher than atmosphere pressure, it has been found that such conversion may be more suitably accomplished at from atmospheric pressure (e.g. 0 p.s.i.g.) up to 200 p.s.i.g., preferably up to 100 p.s.i.g., and that maximum yields of guanidine may be obtained at relatively low pressures of from 40 p.s.i.g. to 60 p.s.i.g. (i.e. pounds per square inch gauge).

The terms "catalyst" or "reaction product of ammonia and a pentavalent phosphorous oxide," as used herein, are intended to include the products formed by a reaction between liquid or gaseous ammonia, preferably anhydrous liquid or gaseous ammonia, and a pentavalent phosphorous oxide. Such reaction products comprise mixtures of complex polymeric pentavalent phosphorous compounds of varying chain lengths which contain some amido and imido groups. Depending upon the method of preparation, these reaction products usually contain up to 20% by weight of nitrogen in the final reaction product a portion of which nitrogen is chemically bonded to phosphorous atoms. The amount of liquid or gaseous ammonia employed in forming the reaction products of ammonia and pentavalent phosporous oxide may vary to some extent but is preferably an excess of ammonia which, depending on the method of reacting it with pentavalent phosphorous oxide, will yield a product containing from 12% to 20% by weight of nitrogen based on the amount of reaction product obtained.

Phosphorous pentoxide, which is a form of oxide preferably used to form the catalyst, is known to exist in a number of crystalline and amorphous forms. The most common form is often designated as the H-form, which is a crystalline solid at room temperature. The H-form of phosphorous pentoxide consists of individual $P_4O_{10}$ molecules in which each phosphorous atom is tetrahedrally bonded to four neighboring oxygen atoms. This $P_4O_{10}$ molecule is the simplest known combination of pentavalent phosphorous and oxygen and will be referred to herein as the monomeric form of phosphorous pentoxide. Electron diffraction studies have shown that phosphorous pentoxide vapor also consists of monomeric $P_4O_{10}$ molecules.

Phosphorous pentoxide also exists in two other crystalline forms often designated as O and O', both forms of which are polymeric. Polymeric phosphorous pentoxide further exists in at least two amorphous forms designated as the beta and gamma forms. The various crystalline and amorphous forms of polymeric phosphorous pentoxides are described in detail in the "Encyclopedia of Chemical Technology," volume X, pages 483–488, Interscience Encyclopedia (1953). Although any phosphorous pentoxide may be reacted with liquid or gaseous ammonia to form the catalysts used in the processes of this invention it has been found particularly desirable to use the H-form or monomeric form of phosphorous pentoxide.

The phosphorous pentoxide may be reacted with liquid or gaseous ammonia in a variety of ways to yield the aforementioned reaction products or catalysts used for the conversion of urea to guanidine. Thus, for example, any solid, crystalline or amorphous phosphorous pentoxide, or a mixture of such phosphorous pentoxides may be added with agitation, preferably by mechanical means, to liquid ammonia at −33° C. The excess ammonia is then usually volatilized and a catalyst or reaction product is formed which generally has a nitrogen content of from 18% to 20% by weight. Alternatively, the reaction product or catalyst may be prepared by placing any crystalline or amorphous phosphorous pentoxide in a reaction vessel and contacting it with a stream of gaseous ammonia while the temperature is increased from ambient temperatures (e.g. 30–30° C.) up to 340° C. The gaseous ammonia may contain small amounts of moisture (e.g. up to 0.5%) but anhydrous gaeous ammonia has been found preferable, as hereinafter shown, from the standpoint of the efficiency of the reaction product in catalyzing the conversion of urea to guanidine. The reaction product prepared under such conditions generally has a nitrogen content of 12% to 14% by weight based on the total reaction product.

The preferred catalyst or reaction product may be prepared by still another method which comprises introducing a powdered or finely divided phosphorous pentoxide into a reactor containing an atmosphere of gaseous ammonia, preferably anhydrous gaseous ammonia, wherein an exothermic reaction takes place and a vitreous or glasslike reaction product is formed. Such reaction product usually will have a nitrogen content of from 15% to 17% by weight based on the weight of the total reaction product. This product is preferably ground prior to heating and/or admixture and heating with urea.

The several reaction products of ammonia and pentavalent phosphorous oxides which may be prepared as above-described and which are suitable for use, in accordance with the processes of this invention for the conversion of urea to guanidine and/or melamine, generally comprise or consist essentially of a mixture of complex polymeric compounds wherein from 30 to 50% of the nitrogen atoms present are chemically bonded to phosphorous atoms and from 70% to 50% of the nitrogen atoms are not bonded to phosphorous atoms as determined by nuclear magnetic resonance techniques which are described by Van Wazer et al. in Journal of the American Chemical Society, vol. 78, page 5705 (1956).

In accordance with one embodiment of this invention it is possible to convert urea to guanidine by contacting the aforedescribed catalyst or reaction product, or mixtures thereof, with solid or molten urea in a reaction vessel and heating the reaction vessel and contents to a temperateure in the range of from 132° C. to 350° C., preferably 190° C. to 350° C., more preferably 210° C. to 320° C. for from about 15 minutes to about 45 minutes. A mixture of guanidine and catalytic reaction product is thereby formed. Alternatively, the urea and catalyst may be separately heated to such temperature and mixed together in a reaction vessel at such temperature.

Although the conversion of urea to guanidine may be carried out at atmospheric or at slightly elevated pressures (e.g. up to 200 p.s.i.g.) it has been found that almost quantitative yields, that is, 1 mol of guanidine per mol of urea, may be obtained when the conversion is carried out at pressures of between 40 and 60 p.s.i.g. It is possible to obtain yields of guanidine, based on the urea charged, of from about 60% to 80% when the conversion is conducted at atmospheric pressures or at pressures above 100 up to 200 p.s.i.g. On the other hand, it is possible to obtain guanidine yields of 95% or higher when the conversion is conducted at a pressure above 40 p.s.i.g. and below 100 p.s.i.g., preferably from 40 to 60 p.s.i.g.

The pressure in the reaction vessel may be readily obtained by sealing the vessel prior to heating the urea and catalyst. Such pressure is autogeneously produced, that is the pressure is partly formed from the volatilzation of urea, which vaporizes at temperatures above 132° C. Also, a small amount of urea decomposes to ammonia and/or ammonium cyanate gas in the reactor which substantially contributes to the balance of the pressure within the reaction vessel.

The amount of urea charged to the reaction vessel containing the catalyst may vary widely depending upon the particular catalyst employed or upon the reaction time desired. Generally speaking the amount of urea will usually be in the range of from 5% to 60% of the total weight of the urea and the catalyst charged and preferably will be in the range of from 10% to 40% of the total amount of the urea and catalyst charged.

The time required for the conversion of urea to guanidine under the above-described conditions will also vary depending upon the amount of catalyst used and upon the temperature and pressure employed but usually will be in the range of from 15 to 45 minutes, the longer time being generally required when the amount of urea is between 5% to 10% of the total reaction mass and when the conversion is carried out at low pressure and temperature, for example at 0 p.s.i.g. and at a temperature between 132° C. and 190° C. Where the amount of urea is between 10% and 40% by weight and the amount of catalyst is between 90% and 60% by weight, and the temperature of these reactants in the reaction vessel is 190° C. to 350° C. and the pressure is 0 p.s.i.g. the conversion time is usually between 25 and 35 minutes. Under these latter conditions, when the pressure employed is from 60 to 100 p.s.i.g. the conversion time is usually 15 minutes to 25 minutes.

During the conversion the guanidine forms in the reaction vessel on the surface of or partially mixed with the catalytic reaction product in the form of a reaction mass from which it can be readily separated by a variety of procedures which will be apparent to those skilled in the art. The exact form in which guanidine is present in the reaction mass (e.g. whether or not guanidine exists as a free base or is chemically or physically bonded to the catalyst) is not known with certainty but guanidine can readily and easily be obtained from the reaction mass in the form of the free base or as a salt. By way of example, the reaction mass may be slurried or dispersed in a liquid solvent in which guanidine is soluble such as water or a mixture of water and a water miscible organic liquid, liquid ammonia and in which the catalyst is insoluble. The guanidine dissolves in the liquid and may be separated from the insoluble catalyst by filtration, centrifugation, decantation, sedimentation or the like. The guanidine, which is soluble in the solvents, forms a solution of guanidine and the solvent from which the guanidine may be recovered as the free base by separating or evaporating the solvent from such solution.

It may often be desirable, since guanidine in the form of the free base is relatively unstable, to obtain the guanidine from the aforementioned reaction mass in the form of a salt of guanidine and a suitable acid. Such guanidine salts, which are usually water-insoluble, may readily be obtained during the separation of guanidine from the catalyst by methods well-known to those skilled in the art. For example, guanidine salts such as guanidine sulfate and guanidine pricrate may be directly prepared and obtained from the reaction mass containing guanidine and the catalytic reaction product by forming a slurry of the reaction mass in a small quantity of water, or water and a water miscible organic solvent, in which the catalyst is insoluble but the free guanidine is soluble. Thereafter the catalytic reaction product may be readily separated from the liquid by filtration after which it can be dried and re-used to convert urea to guanidine. The solution may then be treated with a suitable dilute acid solution to form an insoluble guanidine salt which precipitates and can be readily separated from the liquid by filtration, centrifugation, sedimentation and the like.

It has been found to be possible to obtain guanidine by heating urea and any of the aforedescribed catalytic reaction products in accordance with the above procedure. The catalytic reaction product can be charged to the reactor in the form of a solid mass or a block, in the form of coarse particulates, or may be finely ground. The urea may be charged to a reactor as a powder or as coarse granules or may be preheated and charged to the reactor as a molten mass. However, it has generally been found preferable, in order to obtain maximum yields to mix the urea in granular or powdered form with the catalytic reaction product (which is also in granular or powdered form) and to add the resulting mixture to the reaction vessel. If desirable the mixture may be heated to a temperature above 132° C. prior to charging it to the reaction vessel. It has been found particularly desirable to grind and/or mix the urea and catalytic reaction product so that all of the particles of the resulting mixture will pass through a No. 120 mesh, preferably a No. 200 mesh, more preferably through a 325 mesh U.S. standard screen which mixture may then be heated within the range of temperatures and pressures as above described.

It has presently been found that the guanidine in the reaction mass comprising guanidine and the catalytic reaction product, can be converted to melamine without separating the guanidine from the reaction mass. Such conversion may be readily accomplished by heating the reaction mass at a temperature of from about 290° C. to 350° C., preferably from about 310° C. to 330° C., in the presence of an atmosphere or gas stream comprising ammonia. The conversion is usually effected at atmospheric pressure (that is, about 0 p.s.i.g.). Melamine may be obtained at such pressure by heating the guanidine-catalyst mixture which generally contains from about 5% to 60% by weight of guanidine and from about 95% to 40% by weight of catalytic reaction product, in the presence of or in contact with gaseous ammonia, and at a temperature in the range of from 290° C. to 350° C., preferably 310° C. to 330° C., for from 15 minutes to 3 hours.

The guanidine-catalyst reaction mass may be contacted with gaseous ammonia at the aforementioned temperature in a number of ways to effect the conversion of guanidine to melamine. It has been found particularly suitable to effect such conversion by contacting the reaction mass with gaseous ammonia by passing a stream of gaseous ammonia in contact with such reaction mass. Upon such contact melamine is formed as a vapor or as a finely divided, particulate solid, or "smoke" in the ammonia gas stream and the gas stream is preferably continuously passed in contact with the reaction mass until no additional melamine is formed. Although ordinary gaseous ammonia, e.g. ammonia containing small amounts of moisture may be used, it is preferred to use a gas stream of anhydrous ammonia.

The ammonia gas stream may be at ambient temperature or pre-heated to a temperature of up to 350° C. prior to contact with the reaction mass. However, there is no advantage to preheating the ammonia since it is almost instantaneously heated to the temperature of the reaction mass, e.g. 290° C. to 350° C. upon contact therewith. The total amount of ammonia employed may vary to some extent depending upon the rate at which the gas stream is contacted with the reaction mass, but generally speaking, will be an amount by weight of from one to ten times the weight of the reaction mass. The rate at which the ammonia gas stream is passed in contact with the reaction mass may vary to some extent but is usually a rate of from 0.1 to 10 volumes per minute based on the volume of the reactor in which the contact takes place. The ammonia gas stream is passed through the reactor until all the guanidine has been converted to melamine. Optimum yields are usually obtained when from 1 to 5 volumes of ammonia per minute, based on the volume of the reaction vessel are passed through the reaction vessel. The gaseous ammonia is generally contacted with the reaction mass until melamine is no longer formed and such contact generally requires from 15 minutes to 3 hours, although the conversion of guanidine to melamine is usually substantially completed in from 1 to 2 hours.

It is important that substantially atmospheric pressures be used in the conversion of the guanidine (in the form of a mixture of guanidine and the catalytic reaction product) to melamine. Although some melamine may be formed at pressures above 0 p.s.i.g. some of the guanidine decomposes to form decomposition products such as ammonia and ammonium cyanate and also some guanidine may be reconverted to urea. There is further disadvantage in the use of increased pressures due to the cost of pressure resistant equipment. It is also important that temperatures in the range of about 290° C. to 350° C. be employed, even though melamine is formed at temperatures above or below this range. Where the conversion of guanidine is conducted above 350° C. decomposition products such as ammonia and ammonium cyanate may be formed and when such conversion is conducted below 290° C. some of the guanidine is reconverted to urea.

When the mixture of guanidine and catalytic reaction product is contacted with ammonia under the aforedescribed temperature and pressure conditions the mixture appears to foam and exhibits a substantial increase in volume. Whether the guanidine or part of the guanidine is converted to melamine while mixed with the catalytic reaction product or whether the guanidine liquifies and partially separates from the catalytic reaction product prior to entering the gas stream as a suspended vapor or "smoke" is not known with certainty. In any event when the gaseous ammonia is contacted as described with the reaction mass, comprising guanidine and the catalytic reaction product, melamine is formed in the gaseous ammonia as a suspended vapor or a finely divided particulate solids and can be separated from the ammonia as heretofore described. Melamine may thus be obtained in yields of from 55% to 75% based on the theoretical conversion of 3 mols of urea to 1 mol of melamine.

In a preferred embodiment of this invention the catalyst or reaction product of ammonia and a pentavalent phosphorous oxide is first prepared by reacting monomeric (H-form) phosphorous pentoxide and anhydrous gaseous or liquid ammonia to form a reaction product comprising mixtures of polymeric pentavalent phosphorous compounds containing amido and imido groups as above described. The catalyst or reaction product is further characterized in containing from 12% by weight of nitrogen wherein from between 30% to 50% of the nitrogen atoms are chemically bonded to phosphorous atoms.

The catalyst is then usually ground and intimately admixed with urea usually in a mechanical mill such as, for example, a ball mill, in such an amount and for a time such that the total mixture contains from 5% to 60% by weight of urea and from 95% to 40% by weight of catalyst and has a particle size such that all of the particles will pass through a No. 120 mesh standard U.S. screen. The mixture is usually then heated in a reaction zone, preferably a closed system or zone for example in a suitable reaction vessel at a temperature in the range of between 210° C. and 320° C. and at a pressure in the range of from 40 p.s.i.g. to 60 p.s.i.g., for from 15 minutes to 45 minutes. By so proceeding there is formed a reaction mass comprising from about 5% to 60% by weight of guanidine and the reaction product of anhydrous ammonia and H-form phosphorous pentoxide, from which reaction product the guanidine may be separated as the free base or in the form of a salt as hereinbefore described.

Where it is desired to convert the guanidine directly to melamine without separating it from the mixture, such process can be suitably accomplished by heating the mixture in the same or another reaction vessel at atmospheric pressure and at a temperature of from 290° C. to 350° C., preferably a temperature of from 310° C. to 330° C. for from 1 to 3 hours in contact with a stream of gaseous ammonia, preferably anhydrous gaseous ammonia, in which melamine forms as a suspended vapor in the form of fine solid particles. The reaction mass initially increases in volume and appears to foam. Such foam, in contact with the hot ammonia gas stream, is partially converted to a vapor or "smoke" comprising finely divided particulate melamine in the hot gas stream. The finely divided melamine is carried along in the gas stream as a vapor or "smoke" and can be separated from the gas stream and collected in pure form by cooling, condensation, precipitation, filtration and the like as above described.

It is possible, in accordance with the processes of this invention, to obtain yields of up to 75%, usually 55 to 70%, of melamine based on the theoretical conversion of 3 mols of urea to one mol of melamine.

In a particularly preferred embodiment of the present invention urea and a reaction product of ammonia and a pentavalent phosphorous are mixed prior to conversion to guanidine and/or melamine with such reaction product in a finely divided state. The preferred particle size of the particles of such reaction product after mixing is such that all, or substantially all, of the particles will pass through a No. 200 mesh, or through a No. 325 mesh, U.S. standard screen. The particles of the resultant urea-reaction product mixture will preferably be of such size that all of the particles will pass through a No. 200 mesh or finer, U.S. standard screen.

It has also been found desirable to heat the urea and ammonia-phosphorous pentoxide reaction product mixture in a closed zone or vessel since urea tends to volatilize and also to form some ammonia and/or ammonium cyanate at temperatures just above its melting point and losses of urea through such volatilization would otherwise occur. The volatilization of urea may be further reduced by using a reactor where the vapor is at a minimum and in which slightly elevated pressures e.g. above 0 and up to 100 p.s.i.g. may be maintained. Such a reactor may be either a standard reaction vessel, an autoclave or a standard pressure resistant glass reactor, the more important consideration, from the standpoint of yield, being a minimum vapor space to minimize or substantially prevent the volatilization of urea and the accompanying formation of significant amounts of ammonia and/or ammonium cyanate. The volume of "vapor space" in the reactor should generally not be greater than four times the volume of the urea-catalyst mass and is preferably about one half of the volume of such mass.

In the preferred conversion of the mixture of the guanidine-catalytic reaction product to melamine, such conversion is usually carried out at a temperature in the range of from 290° C. to 350° C. for from 1 to 3 hours in an atmosphere of ammonia and at atmospheric pressure. At temperatures just below 290° C. some guanidine may be converted back to urea while some decomposition of guanidine occurs at temperatures above 350° C. The conversion may be carried out in the same reactor provided there are means for introducing gaseous ammonia into the reactor subsequent to the conversion of urea to guanidine and subsequently recovering the ammonia and melamine after passage through the reactor. Alternatively the aforementioned mixture may be transferred from the pressure vessel to another reaction vessel to provide increased space or vapor space for the gaseous ammonia and also for the transport of the finely divided melamine which is formed in the ammonia gas stream in the conversion process.

The amount of anhydrous ammonia and the rate of flow thereof, through the reactor during the contact with and conversion of guanidine to melamine may vary to some extent, depending upon the amount of guanidine-catalytic reaction product mixture present, the size of the reactor and the method of separating the melamine from the gas stream. Usually the amount of ammonia in the form of a gas will vary, on a weight basis, from an amount equal to the amount of guanidine present in the aforementioned mixture to ten times the weight of the guanidine. Optimum yields are usually obtained when from five to ten times the weight of ammonia based on the weight of the guanidine is used to contact the reaction mixture and the ammonia is passed through the reactor at a rate of from one to five volumes, based on the volume of the reactor, per minute.

A further understanding of the processes and compositions of this invention will be obtained from the following specific examples which are intended to illustrate the invention and not to limit the scope thereof parts and percentages being by weight unless otherwise specified.

*Example I*

One hundred grams of solid monomeric (H-form) phosphorous pentoxide was slowly added, over a five minute period and with stirring, to 500 grams of liquid ammonia which was at a temperature of −33° C. After the addition of the phosphorous pentoxide the stirring was continued for several minutes and the liquid ammonia was evaporated leaving 123 grams of a white amorphous particulate catalytic reaction product having particles which passed through a No. 120 mesh U.S. standard screen and which had a nitrogen content of 18.5% and in which 57% of the nitrogen atoms were bonded to phosphorous atoms.

Twenty grams of this material were added to a horizontal reactor made of pressure resistant glass having an inside diameter of 1¼ inches, a length of 6 inches and containing an opening at one end designated the entrance portion provided with a valve for the introduction of gaseous ammonia and a thermocouple well and another opening at the exit portion with a stopper for the introduction of urea and the reaction product. The glass tubing was wound on the outside with ⅛" x 0.0089" Nichrome resistance ribbon connected to an eltctrical circuit with a variable transformer to provide regulated heat. A piece of wire gauze (stainless steel) was placed at the bottom of the horizontal tube as a support for the urea catalyst mixture and a thermocouple having connections through the thermocouple well was placed in close proximity to the wire gauze to measure the temperatures inside the reactor. The opening at the exit portion of the tube was provided with a pressure gauge and a closure valve atttachment to which could be attached an ammonia removal tube when the closure valve was in the open position.

Seven grams of powdery urea having a particle size of between 20 and 50 microns were added to the reactor which contained twenty grams of the catalytic-reaction product having a particle size such that all of the particles passed through a No. 120 U.S. mesh standard screen and which were supported on a fine wire gauze. The urea-catalyst were not initially mixed. The reactor was then heated to a temperature of 230° C. by means of the electrical resistance Nichrome wire with the ammonia inlet valve in the closed position and with the outlet valve in the open position for about 45 minutes so that the reaction would take place at 0 p.s.i.g. During this time the urea became molten and fused with the catalyst and a small amount of the urea volatilized to ammonium cyanate and ammonia gases which passed through the opening at the exit portion of the reactor.

At the end of the 45 minute period the reaction mass which weighed 26.5 grams was washed from the reactor with 100 ml. of 25% aqueous solution of ethyl alcohol in which the guanidine was soluble and the $NH_3$—$P_4O_{10}$ catalytic reaction product was insoluble. The resultant slurry was filtered and the catalytic reaction product was dried and set aside for re-use in the reactor. Ten milliliters of a 15% solution of sulfuric acid was then added to the filtrate and white precipitate formed consisting of 7.5 grams of guanidine sulfate representing a yield of 69% of guanidine based on a theoretical conversion of 1 mol of guanidine for each mol of the urea charged.

*Example II*

The procedure of Example I was repeated using 20 grams of fresh (unused) catalytic reaction product as prepared in that example and five grams of urea. During the heating of the reactor the exit valve was maintained in the closed position and the pressure in the reactor was permited to rise to 55 p.s.i.g. As in Example I, the temperature was maintained at 230° C. but the reaction was discontinued after 30 minutes. The reactor was vented and the gases emanating from the reactor were found to consist of small, e.g. 1–2 milligram quantities, of ammonia and ammonium cyanate. The reaction mass was treated and filtered to obtain guanidine sulfate and the $NH_3$—$P_4O_{10}$ reaction product in accordance with the procedure of Example I. Five and one half grams of guanidine sulfate were obtained representing a yield of 96% guanidine based on the theoretical conversion of one mol of urea charged to one mol of guanidine. Stated differently, 96% of the urea was converted to guanidine which was recovered in the form of guanidine sulfate.

*Example III*

The guanidine-catalytic reaction mass was prepared as described in Example I except that the mass was not removed from the pressure glass reaction vessel. Instead, the temperature in the reactor was increased to 310° C. and gaseous anhydrous ammonia was introduced into the reactor through the ammonia inlet tube. The opening at the exit of the reactor was provided with a U-tube, the distal portion of which was attached to cooling coils. A water-cooled condenser was attached to a collection flask and a tube at the exit portion of the collection flask terminated in a container of water where the gaseous $NH_3$ was recovered as $NH_4OH$. As the gaseous ammonia flowed through the reactor at a flow rate of 0.1 liter per minute, the reaction mixture foamed to a height of about three inches and a white vapor or smoke was observed to emanate from the foaming mixture. This vapor or smoke continued to evolve from the reaction mixture for 90 minutes after which the foaming subsided. The smoke which condensed in the condenser and was collected in the collection flask, was found to be substantially pure melamine and was obtained in a quantity of 3.2 grams. The yield of melamine was 61%, based on the theoretical conversion of 3 mols of the urea, initially charged, to one mol of melamine. The above procedure was repeated except that the urea was mixed with catalytic reaction product which had been previously used in preparation of guanidine and a yield of 3.3 grams of melamine was obtained.

*Example IV*

The conversion of urea to guanidine and/or melamine was carried out in a vertical cylindrical iron pressure reactor having a 4-inch inside diameter, a 4¼ inch outside diameter and a height of six inches. The reactor was provided with an ammonia inlet tube and closure valve at the bottom and a removable top or lid which could be bolted and gasket-sealed in place after the addition of the urea and catalytic reaction product. The lid was provided with an opening containing a tube provided with a thermocouple well and a thermocouple therein to measure reaction temperature, a 200 p.s.i.g. pressure gauge and ¼ inch needle valve. The tube was provided with fittings to which could be attached a water cooled condenser to separate melamine from the ammonia gas stream and a conveyor tube for recovery of ammonia which issued from the reactor. The outside of the reactor was enclosed in a 1/16 inch asbestos sheet which sheet was spirally wound with ⅛" x 0.0089" Nichrome resistance ribbon wherein the spirals of the Nichrome ribbon were spaced ¼ inch apart. The Nichrome ribbon was electrically connected to an electric circuit provided with a variable transformer to regulate the heat of the wire and thereby the temperature of the reactor and the contents thereof. The bottom of the reactor was provided with a layer of 3/32 inch diameter glass beads to support the urea and the catalytic reaction product.

Two hundred grams of powdered monomeric (H-form) phosphorous pentoxide was added slowly over a 30 minute period to a separate 5 liter glass reaction vessel through which a stream of anhydrous ammonia was passed at a rate of 5 liters per minute during the entire time of addition of the phosphorous pentoxide. The temperature in the vessel immediately increased from 25° C. to about 200° C. indicating that an exothermic reaction had occurred. The product formed was a continuous amorphous glassy-like solid which congealed at the bottom of the reaction vessel. A total of 232 grams of reaction product, the result of the reaction of the phosphorous pentoxide and ammonia, was recovered from the bottom of the flask. Upon analysis the product was found to contain 16.5% nitrogen and 45% of the nitrogen atoms were found to be bonded to phosphorous atoms as determined by the previously herein described nuclear magnetic resonance technique. The reaction product was ground in a hammer mill to a particle size such that all the particles would pass through a 200 mesh U.S. screen. Sixty grams of the reaction product were mixed and ground with 20 grams of urea in a ball mill to provide an intimate admixture of urea and the reaction product of ammonia and polyvalent phosphorous oxide all of the particles of which mixture passed through a No. 200 U.S. mesh standard screen. The resultant eighty grams of mixture were introduced into the top of the aforedescribed iron reactor and on the glass beads at the bottom of the reactor. The reactor was then sealed and heated to a temperature of 230° C. for 25 minutes, at a pressure of 60 p.s.i.g. The reactor which contained a reaction of guanidine and the $NH_3$—$P_4O_{10}$ product was vented to remove a small amount (e.g. 50 milligrams) of a mixture of ammonia and ammonium cyanate which had formed during the reaction. Anhydrous gaseous ammonia was then introduced over a period of 1 hour and 40 minutes at the rate of 0.25 liter per minute into the bottom of the reactor, which contained the reaction mass (prepared as described above) of guanidine and catalytic reaction product, and the temperature of the reactor was raised to 340° C. The gaseous ammonia was carried through the reactor and passed into the gas conduction tube at the top of the reactor. The reaction was carried out at atmospheric pressure. The product which formed in the hot $NH_3$ gas stream was collected as it condensed out of the gas stream in a flask attached to the cooling condenser placed in the gas conduction tube. The ammonia was recovered as $NH_4OH$ by means of a water trap. The passage of $NH_3$ through the reactor at the above described rate was continued for 1 hour and 40 minutes after which time no further melamine condensed. The product in the collection flask, which weighed 9.2 grams, was analyzed and found to consist of substantially pure melamine. The yield of melamine based on the urea charged was 61% based on a theoretical conversion of 3 mols of urea, initially charged, to 1 mol of melamine. There was no evidence of iron contamination in the melamine and the reactor exhibited no sign of corrosion.

*Example V*

The procedure of Example IV was repeated except that an eighty gram mixture of urea and reaction product of ammonia and phosphorous pentoxide in the same proportions as in Example IV were heated in the reaction vessel (described in Example IV) at a temperature of 190° C. and at a pressure of 40 p.s.i.g. Melamine was obtained from the resultant reaction mixture by passing a stream of anhydrous ammonia through the reaction vessel at a rate of 2 liters per minute. After 45 minutes no further condensation of melamine could be detected and the reaction was discontinued. The resultant product weighed 11.4 grams and upon analysis was found to consist of pure melamine. The yield of melamine based on the urea charged was 71%, based on the theoretical conversion of 3 mols of urea to 1 mol of melamine.

The above process was repeated seven times re-using the same $NH_3$—$P_2O_5$ catalytic reaction product and approximately the same yields of melamine were obtained. The above process was also repeated three times, reusing the same catalytic reaction product except, that the reaction mass comprising guanidine and catalytic reaction product which was initially formed in the urea conversion, was removed from the reaction vessel prior to treating the mixture with anhydrous ammonia and conversion to melamine. Guanidine was separated from the reaction mixture in the form of the sulfate salt in accordance with the separation procedure described in Example I. In each instance guanidine yields in excess of 95%, based on the conversion of 1 mol of urea charged to one mol of guanidine were obtained.

*Example VI*

Three pounds of the reaction product of ammonia and monomeric phosphorous pentoxide prepared according to the procedure described in Example IV were mixed with 1.2 pounds of urea in a ball mill for six hours. All of the resultant mixture which passed through a 200 mesh screen was charged to a three-quart glass lined autoclave and heated at 220° C. under an autogenously developed pressure of 50 p.s.i.g. for 30 minutes. At the end of this period the autoclave was vented, the volatile material was collected, analyzed and found to contain 0.02 lb. of ammonium cyanate. The contents of the reactor were removed and placed in a six-quart Pyrex glass reaction vessel containing electrical heating coils and provided with an ammonia inlet tube and an outlet tube. The outlet tube was further provided with a water cooled condenser and collection flask for separating melamine from the $NH_3$ gas stream and a water trap to recover gaseous ammonia. The reactor was heated to a temperature of 315° C. for 90 minutes during which time a gas stream of anhydrous ammonia was continuously passed through the reaction vessel at a rate of 5 volumes per minute, based on the volume of the reactor. A total of 12.5 lbs of anhydrous ammonia was used over the 90 minute period. The amount of melamine collected in the collection flask, which was water cooled to a temperature of 150° C. was 0.59 lb. The gaseous ammonia was converted to $NH_4OH$ in the aforementioned water trap. The melamine yield was 70%, based on the theoretical conversion of three mols of urea charged to one mol of melamine. The product was found upon analysis to consist of substantially pure melamine.

What is claimed is:

1. The process which comprises heating urea in the presence of a polymeric reaction product of anhydrous ammonia and a pentavalent phosphorous oxide and containing amido and imido groups at a pressure below 200 p.s.i.g. and at a temperature in the range of from about 132° C. to 350° C. thereby forming a reaction mass comprising guanidine and said reaction product.

2. The process which comprises heating an intimate mixture of from 5% to 60% by weight of urea and from 95 to 40% by weight of a catalyst consisting essentially of a polymeric reaction product of anhydrous ammonia and a pentavalent phosphorous oxide and containing amido and imido groups, at a temperature in the range of from 132° C. to 350° C., thereby forming a reaction mass comprising guanidine and said catalyst, and, thereafter, recovering guanidine from said reaction mass.

3. The process which comprises heating an intimate admixture comprising from 10% to 40% by weight of urea and from 90% to 60% by weight of a catalyst consisting essentially of a polymeric reaction product of anhydrous ammonia and a pentavalent phosphorous oxide and containing amido and imido groups, at a temperature in the range of from 210° C. to 320° C. and at a pressure in the range of from 40 p.s.i.g. to about 60 p.s.i.g. thereby forming a reaction mass comprising guanidine and said catalyst, and thereafter, recovering guanidine from said reaction mixture.

4. The process which comprises heating a reaction mixture comprising guanidine and a polymeric reaction product of anhydrous ammonia and a pentavalent phosphorous oxide and containing amido and imido groups at a temperature of from 290° C. to 350° C. at substantially atmospheric pressure and in an atmosphere of gaseous ammonia, thereby forming melamine suspended in said atmosphere and thereafter separating melamine from said gaseous ammonia.

5. The process which comprises heating a reaction mixture of from 5% to 60% by weight of guanidine and from 95% to 40% by weight of a polymeric reaction product of anhydrous ammonia and pentavalent phosphorous oxide and containing amido and imido groups at a temperature in the range of 290° C. to 350° C. in a gas stream of anhydrous ammonia and at atmospheric pressure thereby forming melamine suspended in said gas stream and thereafter separating melamine from said gas stream.

6. The method of making melamine which comprises the steps of heating urea in the presence of a polymeric reaction product of anhydrous ammonia and a pentavalent phosphorous oxide and containing amido and imido groups at a temperature in the range of from about 132° C. to 350° C., thereby forming a reaction mass comprising guanidine and said reaction product, subsequently heating the reaction mass so formed at a temperature within the range of 290° to 350° C. and in an atmosphere of gaseous ammonia at atmospheric pressure thereby forming melamine suspended in said atmosphere and thereafter separating malamine from said gaseous ammonia.

7. The method of making melamine which comprises the steps of heating an intimate mixture of urea and a catalyst consisting essentially of a polymeric reaction product of anhydrous ammonia and a pentavalent phosphorous oxide and containing amido and imido groups at a temperature in the range of 190° C. to 350° C. and at a pressure in the range of from 0 p.s.i.g. to 100 p.s.i.g. until a reaction mass comprising guanidine and said catalyst is formed, subsequently heating the reaction mass so formed in a gas stream of ammonia at a temperature within the range of from 290° C. to 350° C. and at atmospheric pressure thereby forming melamine suspended in said gas stream and thereafter separating the melamine from said gas stream.

8. The process of making melamine which comprises (1) first reacting anhydrous ammonia and monomeric phosphorous pentoxide to form a catalytic reaction product comprising mixtures of complex polymeric, pentavalent phosphorous compounds containing 15% to 17% by weight of nitrogen wherein from 30 to 50% of the nitrogen atoms are chemically bonded to phosphorous atoms and having amido and imido groups, (2) intimately mixing from about 10% to about 40% by weight of urea and from about 90% to about 60% by weight of said catalytic reaction product to provide a mixture, said mixture being composed of particles of urea and said reaction product having a particle size such that all of which pass through a No. 120 mesh U.S. standard screen, (3) heating the resultant mixture at a temperature within the range of 210° C. to 320° C. at a pressure in the range of from 0 p.s.i.g. to 100 p.s.i.g. thereby forming a reaction mass comprising guanidine and said catalytic reaction product, (4) heating the reaction mass for from one to two hours at a temperature within the range of from 310° C. to 330° C. in a gas stream of ammonia at atmospheric pressure thereby forming melamine suspended in said gas stream, and (5) thereafter separating and recovering melamine from the ammonia in said gas stream.

9. The process of making guanidine which comprises (1) first reacting a pentavalent phosphorous oxide with an excess of gaseous anhydrous ammonia to form a catalytic reaction product comprising mixtures of complex polymeric pentavalent phosphorous compounds containing amido and imido groups, (2) intimately admixing from about 90% to 60% by weight of said catalytic reaction product with from about 10% to 40% by weight of urea, and (3) heating the resulting admixture at a temperature in the range of from about 210° C. to about 320° C. and at a pressure of from 0 to about 100 p.s.i.g., thereby forming a reaction mass comprising guanidine and said catalytic reaction product, and (4) thereafter recovering guanidine from said reaction mass.

10. The process of making melamine which comprises (1) first reacting anhydrous ammonia and a pentavalent phosphorous oxide to form a reaction product comprising mixtures of complex polymeric pentavalent phosphorous compounds containing amido and imido groups, (2) intimately mixing from about 5% to about 60% by weight of urea and from about 95% to about 40% by weight of said catalytic reaction product, (3) heating the resulting mixture at a temperature within the range of from about 210° C. to about 330° C. at a pressure in the range of from 0 p.s.i.g. to about 100 p.s.i.g. thereby forming a reaction mass comprising guanidine and said catalytic reaction product, (4) heating the reaction mass so formed in a gas stream of anhydrous ammonia for from about 15 minutes to about 3 hours at a temperature in the range of from about 290° C. to about 350° C. at atmospheric pressure thereby forming melamine suspended in said gas stream, and (5) thereafter separating melamine from the ammonia in said gas stream.

References Cited in the file of this patent

UNITED STATES PATENTS

| | | |
|---|---|---|
| 2,338,987 | Watzel | Jan. 11, 1944 |
| 2,469,338 | Mackay | May 3, 1949 |
| 2,561,415 | Rice | July 24, 1951 |
| 2,700,056 | Grosskinsky et al. | Jan. 18, 1955 |
| 2,727,037 | Hochwalt | Dec. 13, 1955 |
| 2,776,286 | Lobdell | Jan. 1, 1957 |
| 2,856,279 | Hignett et al. | Oct. 14, 1958 |
| 3,009,949 | Craig et al. | Nov. 21, 1961 |

OTHER REFERENCES

Davis et al.: Journal of the American Chem. Soc., vol. 44, pp. 2595–2604 (1922).

Boivin: Canadian Journal of Chem., vol. 23, pp. 1467–1472 (1955).